W. E. WARNER.
Presses.

No. 137,641.          Patented April 8, 1873.

Witnesses:

A. Bennerendorf.
Sedgwick.

Inventor:
W. E. Warner
per Munn & Co
Attorneys.

UNITED STATES PATENT OFFICE.

WARREN E. WARNER, OF SYRACUSE, NEW YORK.

IMPROVEMENT IN PRESSES.

Specification forming part of Letters Patent No. 137,641, dated April 8, 1873; application filed March 1, 1873.

*To all whom it may concern:*

Be it known that I, W. E. WARNER, of Syracuse, in the county of Onondaga and State of New York, have invented a new and useful Improvement in Presses, of which the following is a specification:

The invention consists in an improvement of presses, as hereinafter described and pointed out in the claim.

Figure 1:
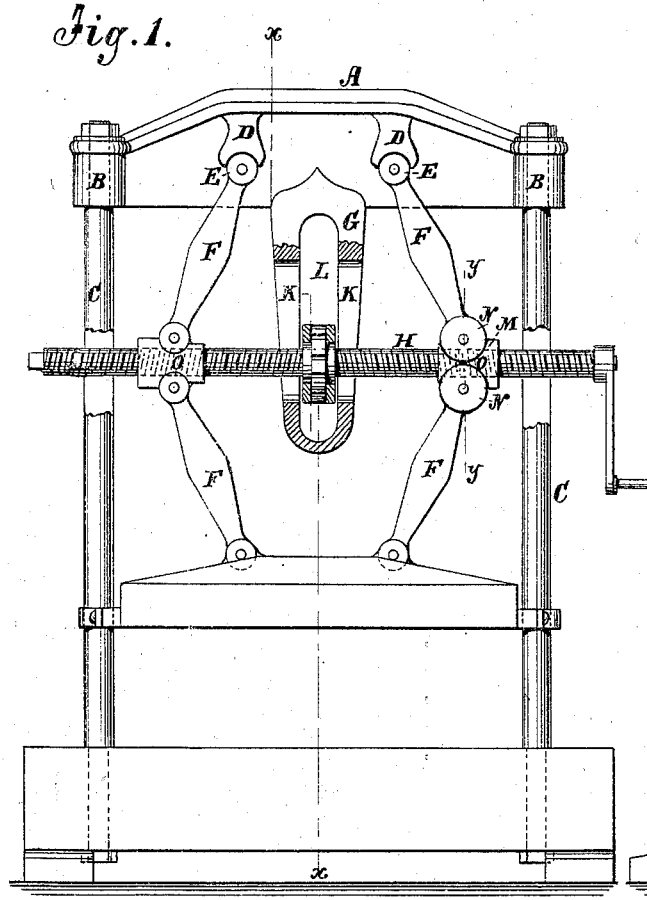
Figure 2:
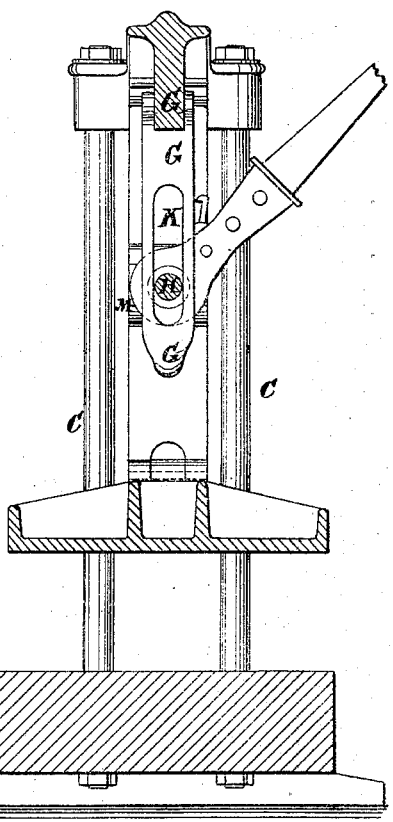
Figure 3:
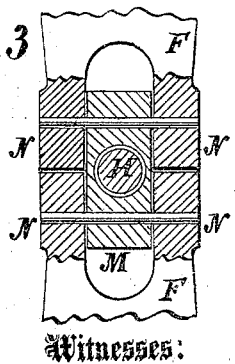
Figure 4:
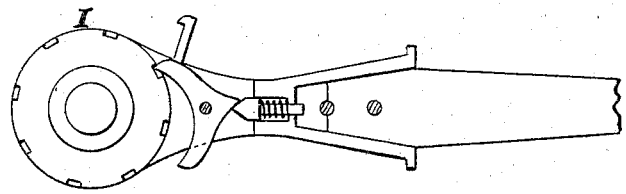

Figure 1 is partly a side elevation and partly a sectional elevation. Fig. 2 is a sectional elevation taken on the line $x\,x$, Fig. 1. Fig. 3 is a section of Fig. 1 on the line $y\,y$; and Fig. 4 is partly a side elevation and partly a sectional elevation of the ratchet, nut, pawl, and pawl-lever for working the screw.

A is a broad and strong metal cross-head for the top of the press, which I propose to cast in one piece, with the holes B for the rods C, lugs D, and sockets E for the upper ends of the toggle-jointed bars F, and with the strong projection G from the under side downward from the center for guiding the screw H and the ratchet-nut I, the said projection having a slot, K, for the screw, and another, L, for the ratchet-nut. This cross-head and stationary guide for the screw I propose to use instead of the ordinary double cross-head and sliding guide, because I can make them in this way much cheaper, and they are more durable, and answer equally well for paper and cloth presses, or any kind in which the substance to be pressed piles up level in the press or nearly so, so that the follower starts level in the beginning of the operation, and does not require the powerful guiding follower-stem commonly used in this kind of press with the double cross-head, between which it works to keep it level at starting, as when pressing cider, hay, and the like. I propose to make the cavities in the nuts M for the round heads N of the bars F, so that the heads of the two bars will meet at the bottoms of the sockets which run into each other, as shown at O, and roll together, so as to transmit the force directly from one bar to the other, and relieve the nuts of the strain, besides changing the friction from sliding to rolling, and thus economize power and wear. The stationary guide for the screw may, of course, be used with a cross-head in two parts, as heretofore, but it is better made in one piece. With these improvements I make the press more simple, durable, and efficient than as heretofore arranged.

Having thus described my invention, I claim as new and desire to secure by Letters Patent—

1. The combination of the stationary guide with the screw, and the lever and nut for actuating it, and with the cross-head, substantially as specified.

2. The arrangement of the sockets with nuts M and the round heads N of the bars F, whereby the latter roll together and transmit the force directly from one to the other in the last part of the pressing operation, substantially as specified.

WARREN EUGENE WARNER.

Witnesses:
 WILLIAM E. ABBOTT,
 JOHN C. CLARKSON.